UNITED STATES PATENT OFFICE.

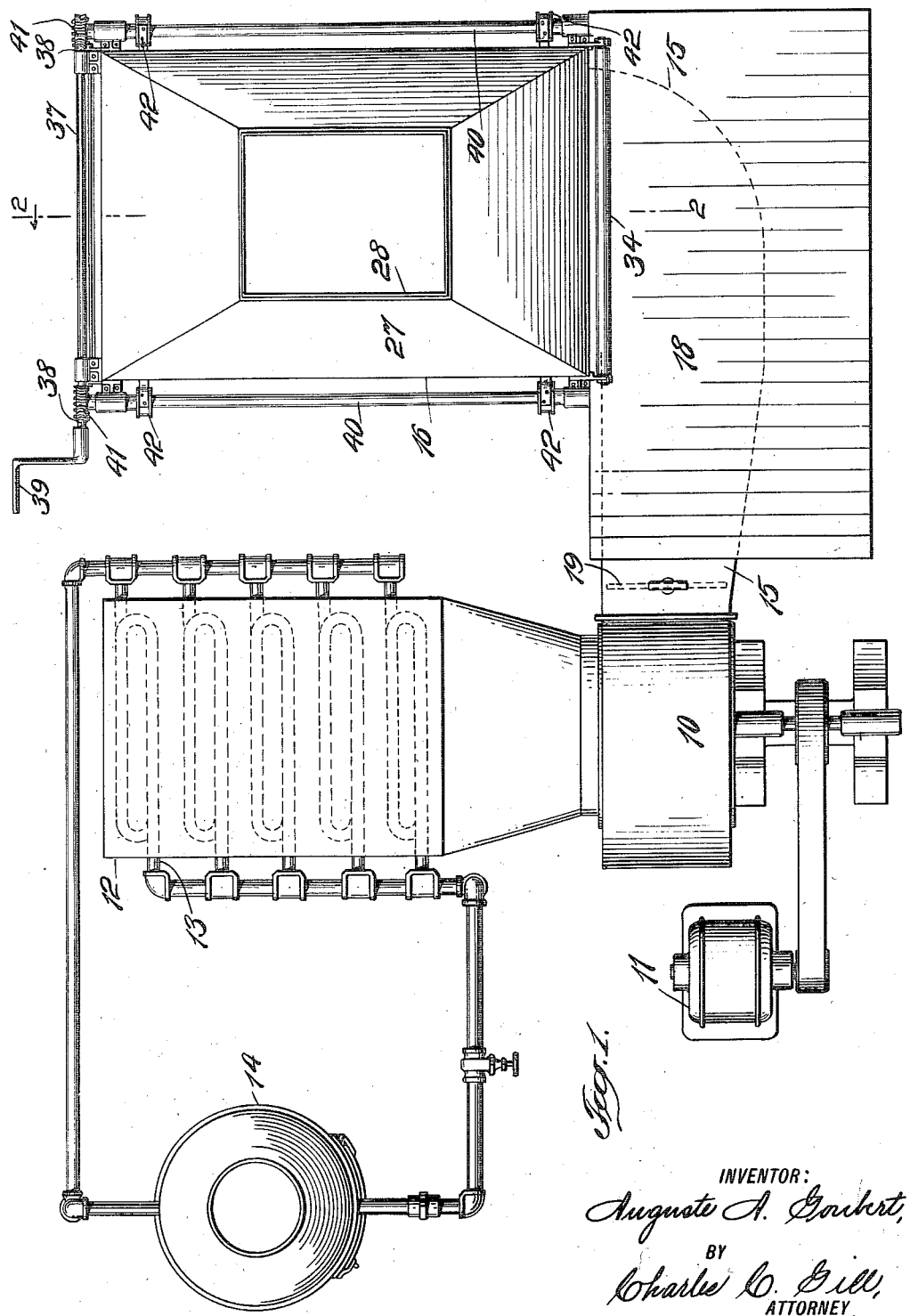

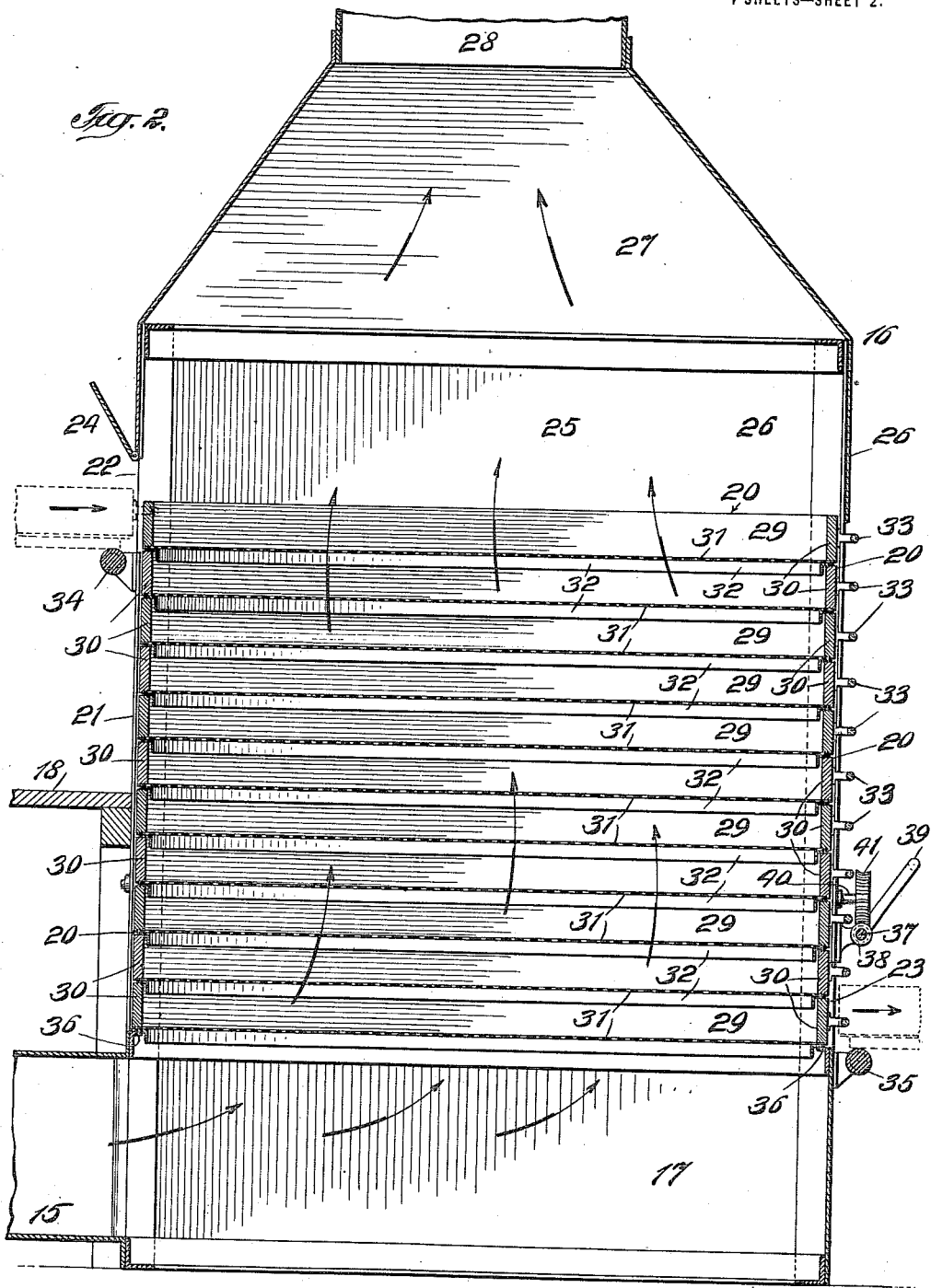

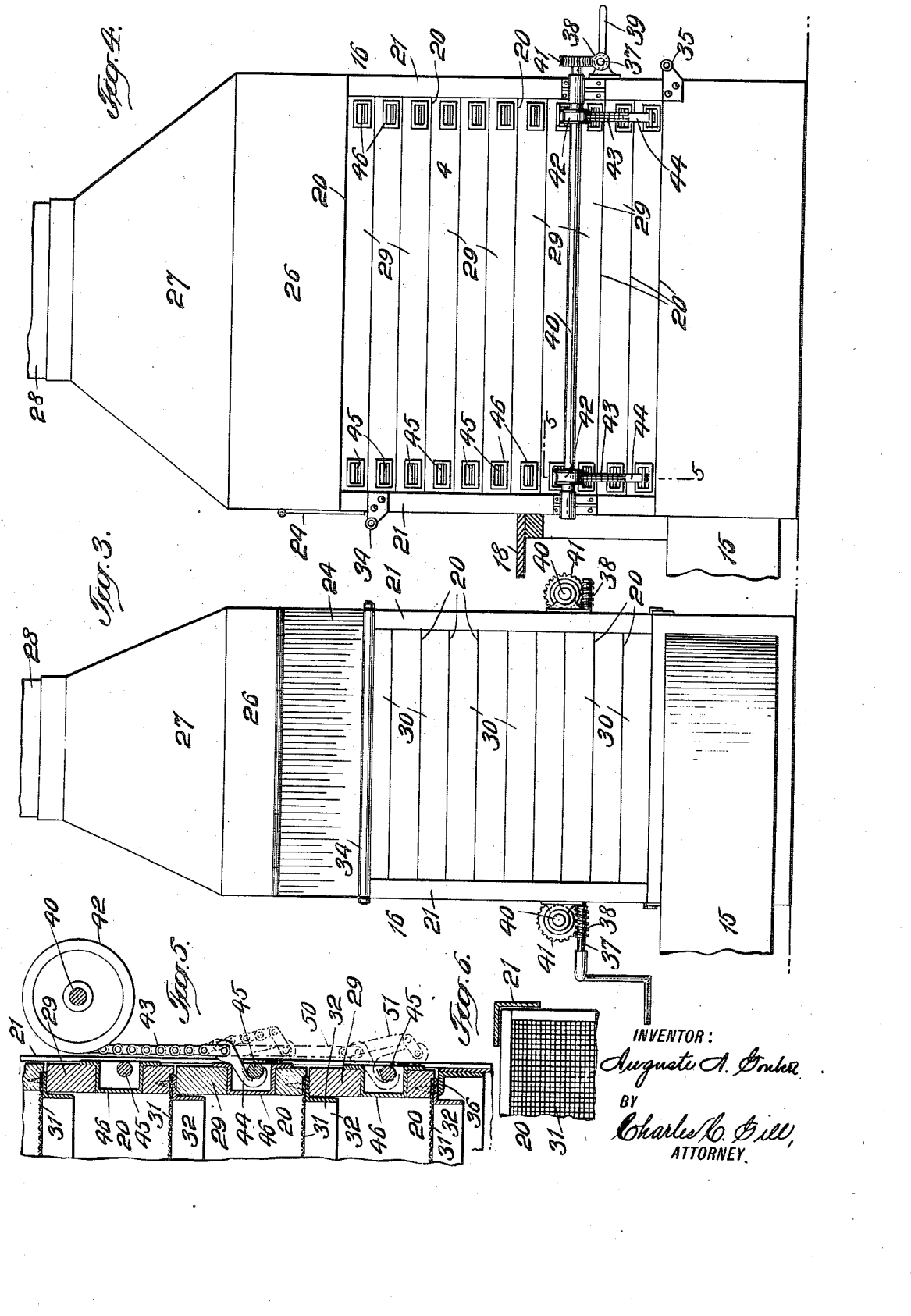

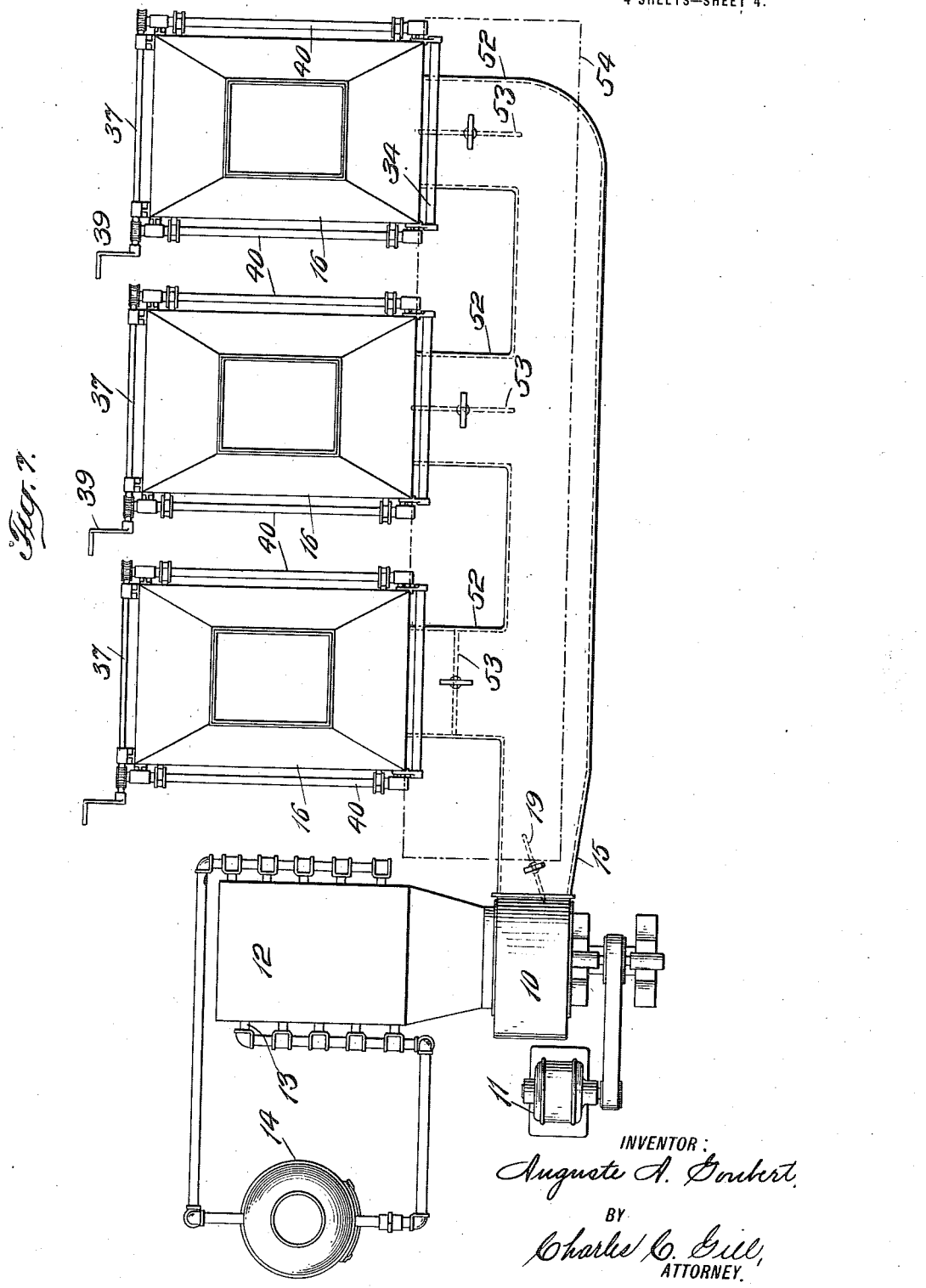

AUGUSTE A. GOUBERT, OF ENGLEWOOD, NEW JERSEY.

APPARATUS FOR DEHYDRATING.

1,305,600.     Specification of Letters Patent.     Patented June 3, 1919.

Application filed June 25, 1917. Serial No. 176,732.

*To all whom it may concern:*

Be it known that I, AUGUSTE A. GOUBERT, a citizen of the United States, and a resident of Englewood, in the county of Bergen and State of New Jersey, have invented certain new and useful Improvements in Apparatus for Dehydrating, of which the following is a specification.

The invention relates to apparatus for dehydrating vegetable and other material in or reduced to reasonably small pieces as, for illustration, cossettes, shreds, slices or the like, and resides more particulary in a novel and highly efficient apparatus for carrying on a process of dehydrating or drying vegetables and fruits which consists in first submitting the raw material to the action of a current of air of high relative humidity and of temperature but little higher than that of the material itself, then of gradually higher temperature and lower relative humidity, progressively, until the material has become dehydrated to such a degree as is sufficient for its preservation; dehydration being slow at first and progressive, rupture of the cell walls by explosion avoided and the cell contents preserved uninjured, so that if thereafter the requisite amount of moisture be restored to the product, it will recover its original appearance, volume and flavor without loss of its nutritive properties.

The processes to be practised with the apparatus made the subject of this application are fully described in my pending application for Letters Patent Serial No. 151,398 filed February 28, 1917.

The apparatus of the present invention comprises a number of trays, preferably of rectangular form, having solid walls and perforated bottoms, the bottoms preferably being of coarse-mesh wire cloth, and these trays are superposed, say ten or twelve in number, and, when in juxtaposition, form a box-like vertical flue with a series of horizontal perforated partitions formed by the bottoms of the individual trays. This stack of trays is mounted upon the open top of an air chamber into which heated air is delivered by a fan blower and blown through the perforated bottoms of the trays successively.

Vegetable or other material to be dried is placed in the trays, all of the trays containing their requisite quantity of the same, and becomes dehydrated by evaporation of the moisture and its absorption by the heated air passing through the box-like flue formed by the trays.

At the start of the operation, supposing all the trays to have been loaded with green material, the material in the lower tray being subjected to the hottest and driest air, will be dried first; this lower tray is then removed with the then dried material therein and the stack of trays is allowed to lower so that the next above tray in the stack will occupy the place of the tray removed. A tray of green material is then placed on top of the stack and the drying operation then re-started by the admission of the properly treated air to the flue created by the stack of trays. When it becomes necessary to remove the lower tray with the dried material therein, the stack of trays above said lower tray must be elevated to release the lower tray, and to carry out this feature of the operation I provide suitable hoisting apparatus adapted to be attached to the tray next above the bottom one and to raise this tray with all of the other trays resting upon it, thereby taking the weight from the lower or bottom tray and permitting of its convenient withdrawal. The hoisting apparatus is then reversed and the whole stack lowered until it rests again upon the air chamber at the base of the drying frame. After the stack has been thus lowered the tray of green material above referred to is placed on top of the stack and the drying operation then started again.

The invention will be fully understood from the detailed description hereinafter presented, reference being had to the accompanying drawings, in which:

Figure 1 is a top view of a dehydrating apparatus embodying my invention;

Fig. 2 is a vertical transverse section, partly broken away and on a larger scale, through the same taken on the dotted line 2—2 of Fig. 1, the dotted lines at the upper left hand portion and lower right hand portion, respectively, indicating the method of applying a tray at the upper end of the stack of trays and withdrawing a tray from the lower end of said stack;

Fig. 3 is a front elevation, partly broken away, of the frame holding the tier or stack of superposed trays;

Fig. 4 is an end elevation, partly broken away and partly in section of the same, Fig.

4 being taken from the right hand side of Fig. 1;

Fig. 5 is an enlarged sectional view through a portion of the stack of trays and parts coöperating therewith, taken on the dotted line 5—5 of Fig. 4. This figure is presented not only to illustrate the construction of the parts on a larger scale than shown in the other figures of the drawing, but to illustrate the manner of hoisting the stack of trays above the bottom tray when it is desired to remove the bottom tray and allow the other trays to settle down within their confining frame or housing;

Fig. 6 is a view, partly in section and partly broken away, showing one of the angle corners of the housing for the trays and a portion of one of the trays, and Fig. 7 is a top view of a modified form of the structure shown in Fig. 1, the modification residing mainly in the employment of a series of the frames for the stacks of trays connected up for joint or separate operation as occasion may require.

In the drawings 10 designates a blower, 11 a motor for driving the same, 12 a duct for air leading to said blower, 13 a heater of any suitable type within said duct, 14 a steam boiler of any suitable type for delivering steam to said heater in a circulating system, 15 a duct for the heated air leading from the discharge side of the fan, 16 a vertical frame adapted to receive the stack of trays, hereinafter described, 17 an air chamber within said frame below the stack of trays and into which the heated air from the duct 15 is delivered, and 18 a convenient platform which may be used by the attendant in applying an upper tray to the stack when the bottom tray is removed therefrom. The air to be delivered to the chamber 17 is drawn through the duct 12 and heated by the coils or the like 13 and then forced through the duct 15 to said chamber 17, and the volume of the heated air passing through the duct 15 may be regulated by a damper 19.

The more novel features of my invention reside in the frame 16, trays 20, and coöperating parts, all of which will be described in detail.

The frame 16 constitutes a housing for the stack of trays 20, and may be formed of any suitable material, such as metal plate, and said frame affords a commodious air chamber 17 within its base and above said base said frame is formed at its corners of angle iron members 21 (Fig. 6) which snugly receive the corner portions of the trays and serve not only to retain the trays but as guides therefor during the vertical movement downwardly of the trays. The angle iron members 21 are, at the front of the frame 16, partly cut away at their upper portion, as at 22, to afford a doorway through which the trays may be applied to position and also through which the upper tray containing fresh matter to be dehydrated may be applied to the stack of trays upon the removal of the bottom tray, with its dehydrated material, from said stack. The lower portions of the rear angle iron corner members 21 are also partly cut away, as at 23, to permit of the horizontal withdrawal of the bottom tray, in the manner indicated by dotted lines at the lower right hand side of Fig. 2. The opening formed by the cut-away portions of the front angle iron corner members, as at 22, and the space thereat about the top tray 20, will normally be kept closed by a hinged door 24, so as to prevent the escape of the air thereat from the chamber 25 formed within the upper portion of the frame 16 and which chamber is closed at its sides and ends by sheets of metal or the like 26. A door is not required at the point 23 because the opening at that location is closed by the rear ends of the trays. The chamber 25 has superposed above it a hood 27 leading to an exit pipe or uptake 28. The sides and ends of the frame 16 between the corner angle members 21 and below the chamber 25, do not require to be closed except by the solid sides and ends of the trays 20 which, when stacked within the frame 16, form side and end walls, below the chamber 25, for said frame.

The trays 20 are all alike and each preferably is rectangular in top elevation, and said trays have each solid sides 29, solid ends 30, preforated bottoms 31, and downwardly extending angle iron flanges 32, the flange 32 of each tray having its vertical portion offset inwardly from the outer edges of the tray so that the same may set downwardly within the upper edge of the tray directly below it. The flanges 32 aid in the proper nesting of the several trays 20 and in preventing the escape of the heated air outwardly over the upper edges of the several trays. The flanges 32 also aid in securing proper vertical movement of the trays when the stack of trays, less the bottom tray, are elevated to permit the withdrawal of the bottom tray and then permitted to descend after such withdrawal. The solid sides and ends of the several trays 20, plus the presence of the downwardly extending edge flanges 32, coöperate in producing a vertical flue having horizontal perforated partitions represented by the bottoms 31, up through which the heated air from the chamber 17 may pass to the dome 27 and uptake 28. The trays 20 are also provided, preferably on their rear ends, with suitable handles 33 to facilitate the withdrawal of the trays as they respectively become the bottom tray of the stack. The frame 16 adjacent to the opening 22 in the upper front portion thereof, is equipped with a suitable roller 34 to facilitate the inward movement of the trays, as indicated at the upper left hand portion of Fig. 2, and said frame 16 adjacent to its lower rear portion is provided with a roller 35 to facilitate the withdrawal of the bottom tray of the stack.

The material to be dehydrated is placed within the trays 20 and the trays are applied to the frame 16, and as the material in the bottom tray becomes properly dehydrated said tray should be withdrawn from the frame 16 and an additional tray containing material to be dehydrated applied upon the stack of trays, as will be understood from what has already been explained. The presence of the flanges 32 along the edges of the bottom of the respective trays makes it necessary, when the bottom tray is to be withdrawn through the opening 23 for the superimposed trays to be elevated from said bottom tray so as to leave said bottom tray free to be withdrawn over the roller 35 from the frame 16, and after the bottom tray has been withdrawn the stack of trays must be lowered so as to properly receive upon the upper end thereof an additional tray containing material to be dehydrated and to compensate for the tray withdrawn. The stack of trays is supported at its lower end upon an inwardly extending angle-iron flange 36, and the fact that the flange 32 of the bottom tray fits within the outline of said flange 36 affords a further reason for elevating the stack of trays above the bottom tray, so that the bottom tray may first be elevated to clear its flange 32 of the flange 36 and be then withdrawn horizontally over the roller 35. Several forms of mechanism may be provided for handling the trays 20 so that the bottom tray may be withdrawn from and a fresh tray supplied to the top of the stack, but I illustrate a form of mechanism preferred by me for this purpose, and this mechanism comprises an operating shaft 37 extending transversely of the frame 16, worms 38 thereon, a crank handle 39 for operating said shaft, and corresponding shafts 40 extending along the sides of said frame 16 and having worm wheels 41 in engagement with said worms 38 and also drums or wheels 42 to which chains 43 are secured and which chains have on their lower ends suitable hooks 44 adapted to be placed in engagement with suitable short bars or pins 45, which, as shown in Fig. 4, I preferably locate within chambers formed within metal casings 46 set into the sides of the trays 20, so as not form undue outwardly projecting obstructions on said trays. There are preferably two of the chains 43 at each side of the frame 16, and the shafts 40 and wheels 42 provided for these chains have simultaneous movement in opposite directions, so that the chains 43 may be relied upon when caught upon the pins or cross-bars 45 of the next-to-the-bottom tray to elevate the stack of trays above said bottom tray and thereby permit the withdrawal of the bottom tray of the stack, after which on a reversal of the motion of the crank 29, the shafts 40, wheels 42 and chains 43 permit the lowering of the stack of trays down upon the flange 36 preparatory to a fresh tray containing material to be dehydrated being applied through the opening 22 upon the stack of trays.

After the operation of the apparatus has been carried on to an extent rendering it desirable to withdraw the bottom tray 20, the inflow of heated air to the chamber 17 will be cut off and the attendant will engage the hooks 44 of the chains 43 upon the bars or pins 45 of the next tray above the bottom tray, after which the shaft 37 will be set in motion and the chains 43 wound upon the drums or wheels 42, said chains being thereby enabled to elevate all of the trays of the stack above the bottom tray and maintain said trays above the bottom tray preparatory to the lifting upwardly of the bottom tray to clear its flange 32 from the supporting flange 36 and the withdrawal of said tray over the roller 35, after which withdrawal of the bottom tray the shaft 37 is reversed in motion and the chains 43 are permitted to pay out so as to lower the then stack of trays upon the supporting flange 36, at this stage the chains 43 taking the substantially taut condition denoted by the dotted lines 50 in Fig. 5; and at the next stage of the operation when the chains 43 are lowered somewhat farther so as to enable the hooks 44 to be conveniently detached from the cross-bars or pins 45 of the tray it engages, said chains take the slack position indicated by the dotted lines 51 in Fig. 5, the tray then originally engaged by the hooks 44 being in its lower position on the flange 36 and it being desirable to free the hooks 44 from said tray and rewind the chains upon the drums or wheels 42 to a sufficient extent to conveniently engage said hooks 44 with the cross-pins or bars 45 of the tray then next above the bottom tray, this latter condition being indicated by the dotted lines of the hook 44 in Fig. 5 at the tray next above the bottom tray.

The operation of the apparatus illustrated in Figs. 1 to 6 inclusive will largely be understood from the description hereinbefore presented, especially when taken in connection with the description set forth in my aforesaid application filed February 28, 1917.

The stack of trays rests upon the open top of the air chamber 17 into which heated air is delivered and blown upwardly through all of the perforated bottoms of the trays successively and through the material, vegetable or of other character, placed in the trays and to be dehydrated by vaporization of the moisture therein and its absorption by the heated air passing upwardly through the flue created by the stack of trays. During the upward movement of the heated air through the stack of trays and the material held by the same, the door 24 will be in closed position so that the air, after having performed its duty, may be confined for its escape upwardly through the uptake 28. At the start of the operation all of the trays 20 are supposed to contain the green material to be dehyrated or dried of otherwise treated by the heated air, and the material in the lower tray being subjected to the hottest and driest air will be dried first. After the material in the bottom tray has received sufficient treatment, said tray is withdrawn in the manner hereinbefore described, first by the elevation of all of the trays above it and then by its elevation from the flange 36 and withdrawal over the roller 35, and thereupon the stack of trays which were above said bottom tray is lowered to the supporting flange 36, and the door 24 opened and an additional tray containing the green material placed upon the top of the stack of trays, after which the door 24 is closed and the drying operation renewed.

In order to obtain rapid and uniform results it is desirable that all of the pieces of material within the trays 20 be simultaneously impinged upon by the current of air, and to secure this result air of uniform temperature and uniform pressure is blown upwardly through the layers of substantially uniform thickness within the several trays 20. After passing through the first or driest layer, that being the one in the bottom tray, the air goes through the second, or next driest, then through the third and so on through the successive layers until after passing through the last or wettest layer, this being in the top tray, the air has arrived at or near the point of saturation. The force of the air current passes in counter direction to the successive stages of the lowering of the stack of trays and has a tendency to raise each piece of material in the trays from the one below it, keeping the material in a sort of semi-floating condition and insuring perfect contact with the air and with the whole surface of each of said pieces. As the material proceeds through the apparatus it is progressively subjected to air of greater and greater drying capacity, slowly losing its moisture at comparatively low temperatures, the final drying at a higher degree of heat taking place in the lower trays when but little moisture remains in the material and there is slight further danger, in case of the dehydrating of such materials as sugar beet cossettes, of the destruction of the cells thereof, the dehydrated cossettes retaining their full saccharine value, and the colloidal contents of the cells being preserved. It is to be observed that in the carrying out of my process the raw material is first subjected to the action of air of hardly higher temperature than that of the material itself and having very little dehydrating effect. It has been found that when sugar beet cossettes in their moist state are directly subjected to high heat, the sudden expansion of their water contents destroys the cell walls and injures the product. The heated air will be of predetermined initial temperature governed by the nature of the material to be dehydrated, and in carrying on the process, considered from the top tray downwardly through the stack, it will be seen that I first submit the raw material to the action of a current of air of high relative humidity and of a temperature a little higher than that of the material itself, then submitting the material in the trays to a current of air of higher temperature and lower relative humidity, progressively, until the material has become dehydrated to such a degree as is sufficient for its preservation; dehydration being slow at first and progressive toward the lower end of the stack.

In the form of the apparatus illustrated in Fig. 7 I do not modify the blower 10, motor 11, duct 12, heating coils 13, boiler 14 or individual frames 16 housing the various stacks of trays, the frames 16 with their trays and details of construction all being alike and counterparts of the construction shown in Figs. 1 to 6 inclusive and therefore requiring no special description. From the conduit 15 leading from the fan 10, I, in the construction shown in Fig. 7, provide branches 52 leading to the hot air chambers below the frames 16 and the trays contained therein, and within each of the branches 52 I provide a damper 53 which may be opened and closed at will, all of said dampers being opened when it is desired to operate all of the several divisions of the machine represented by the frames 16, and one or more of said dampers being closed when it is desired to cut out of operation one or more of the sub-divisions represented by the frames 16. In Fig. 7 I illustrate the two right hand dampers 53 as opened and the two right hand frames 16 in operation, while the left hand damper 53 is shown as closed and the left hand frame 16 out of operation. I may open all of the dampers 53 or close any one of them. The platform numbered 54 in Fig. 7 and corresponding with the platform 18, shown in Figs. 1 and 2, extends along all of the frames 16 so that one platform may be sufficient for all of the subdivisions of the apparatus. I present Fig. 7 as a means for indicating that many modifications of the apparatus will suggest themselves and that I desire to claim my invention broadly and not be confined to the details of construction other than the prior art may render necessary.

The apparatus and method of my invention have been designed with the view of securing very important advantages. The stack of superposed trays having the solid sides and ends and perforated bottoms constitute in themselves a flue up through which the heated air, under pressure, is driven with a force sufficient to overcome the resistance of the surfaces of the trays and the material supported thereon, and a very important feature of the invention is that all of the heated air is confined to its passage through the trays. In this way all of the heated air is utilized, with the result that dehydration takes place with efficiency and great economy in the use of fuel. The bottoms of the trays are covered completely over with the material to be dehydrated, and all of the air is compelled by reason of the solid sides and ends of the trays to pass through this material. The heated air may, therefore, act with maximum efficiency on the material, and all of the heated air is utilized for its intended purpose, there being no escape for the air except upwardly through the stack of trays and the material thereon. The air is passed through the trays and the layers thereon in succession and under a predetermined pressure and with an initial degree of temperature governed by the nature of the material on the trays, and no air can reach the raw material in the upper trays until it has been materially reduced in temperature, avoiding injury due to sudden expansion of the water contents of the cells. It is to be observed that my invention does not reside merely in passing air through the trays either upwardly or downwardly, but in a definite apparatus and method, whereby very distinct economical advantages are obtained and which distinguish my invention from known methods of and apparatus for dehydrating.

As an illustration of the economy realized by my invention, if we assume a drying stack of twelve trays and that the resistance offered by the material in each tray to the passage of the air is equal to $\frac{1}{12}$ inch water pressure, the air velocity through the material will be 1160 feet per minute and the initial pressure required in chamber 17 will be one inch.

Should the trays instead of interlocking be separated and placed in a casing or tower, leaving a space however small around their sides and ends, the velocity through this space due to one inch pressure would be 4000 feet per minute occasioning a great waste of heated air which has no drying effect.

In the apparatus illustrated in the drawings, were the above-mentioned space only $\frac{3}{4}$ inch around the trays, more heated air would be wasted than is required to dry the material.

What I claim as my invention and desire to secure by Letters Patent, is:

1. An apparatus for dehydrating vegetable and other material, comprising an air heater, a stack of superposed trays for said material, and means for driving the heated air through said trays and the material thereon, said trays having side and end walls and perforated bottoms and along said side and end walls downwardly extending flanges to permit each tray to nest upon and engage the tray next below it.

2. An apparatus for dehydrating vegetable and other material, comprising an air heater, a stack of superposed trays for said material, and means for driving the heated air through said trays and the material thereon, said trays having side and end walls and perforated bottoms and along the lower edges of said side and end walls angle iron members whose vertical flanges set inwardly to permit the flanges of each tray to pass downwardly into the upper portion of the tray below it.

3. An apparatus for dehydrating vegetable and other material, comprising an air heater, a stack of superposed trays for said material, and means for driving the heated air in direct succession upwardly through said trays and the material thereon, said trays each having side and end walls and perforated bottoms and also edge flanges engaging the top portion of the tray below.

4. A dehydrating apparatus comprising in combination a vertical stack of superposed trays for containing material to be dried, said trays having recesses in their sides and bars fixed within said recesses, and means for lifting the trays above the bottom tray preparatory to the withdrawal of said bottom tray and thereafter lowering said trays, comprising shafts at opposite sides of said stack and having drums, flexible members arranged to wind on said drums, and hooks at the free ends of said flexible members.

Signed at New York city, in the county of New York and State of New York, this 23rd day of June, A. D. 1917.

AUGUSTE A. GOUBERT.

Witnesses:
ARTHUR MARION,
CHAS. C. GILL.